US007283983B2

(12) United States Patent
Dooley et al.

(10) Patent No.: US 7,283,983 B2
(45) Date of Patent: Oct. 16, 2007

(54) COMPUTER AND VISION-BASED AUGMENTED INTERACTION IN THE USE OF PRINTED MEDIA

(75) Inventors: Michael J. Dooley, San Rafael, CA (US); Barton Elliot Listick, Agoura Hills, CA (US); Paolo Pirjanian, Glendale, CA (US)

(73) Assignee: Evolution Robotics, Inc., Pasadena, CA (US)

( * ) Notice: Subject to any disclaimer, the term of this patent is extended or adjusted under 35 U.S.C. 154(b) by 593 days.

(21) Appl. No.: 10/754,915

(22) Filed: Jan. 9, 2004

(65) Prior Publication Data

US 2004/0215689 A1 Oct. 28, 2004

Related U.S. Application Data

(60) Provisional application No. 60/439,050, filed on Jan. 9, 2003.

(51) Int. Cl.
*G06E 1/00* (2006.01)
*G06E 3/00* (2006.01)
*G06F 15/18* (2006.01)
*G06G 7/00* (2006.01)

(52) U.S. Cl. ..................................... 706/20
(58) Field of Classification Search ................ 706/20
See application file for complete search history.

(56) References Cited

U.S. PATENT DOCUMENTS

| 5,280,265 A | 1/1994 | Kramer et al. |
|---|---|---|
| 5,442,729 A | 8/1995 | Kramer et al. |
| 5,467,447 A * | 11/1995 | Vogel ........................... 715/500 |
| 5,761,485 A * | 6/1998 | Munyan ........................ 715/839 |
| 5,813,406 A | 9/1998 | Kramer et al. |
| 6,035,274 A | 3/2000 | Kramer et al. |
| 6,088,484 A * | 7/2000 | Mead ........................... 382/232 |
| 6,128,004 A * | 10/2000 | McDowall et al. ........... 345/158 |
| 6,377,296 B1 * | 4/2002 | Zlatsin et al. ................ 348/143 |
| 6,701,296 B1 | 3/2004 | Kramer et al. |
| 6,711,293 B1 | 3/2004 | Lowe |
| 6,897,426 B2 * | 5/2005 | Etienne-Cummings et al. ........................ 250/208.1 |
| 7,113,193 B2 * | 9/2006 | Marks .......................... 345/589 |

(Continued)

OTHER PUBLICATIONS

Stephen Se, David Lowe, Jim Little 3Vision-based Mobile Robot Localization and Mapping using Scale-Invariant Features, IEEE,Proceedings of the 2001 IEEE International Conference on Robotics & Automation May 2001, pp. 2051-2058.*

(Continued)

*Primary Examiner*—Anthony Knight
*Assistant Examiner*—Michael B. Holmes
(74) *Attorney, Agent, or Firm*—Knobbe Martens Olson & Bear LLP

(57) ABSTRACT

Media and gesture recognition apparatus and methods are disclosed. A computerized system views a first printed media using an electronic visual sensor. The system retrieves information corresponding to the viewed printed media from a database. Using the electronic visual sensor, the system views at least a first user gesture relative to at least a portion of the first printed media. The system interprets the gesture as a command, and based at least in part on the first gesture and the retrieved information, the system electronically speaks aloud at least a portion of the retrieved information.

57 Claims, 11 Drawing Sheets

U.S. PATENT DOCUMENTS

2003/0214481 A1* 11/2003 Xiong .................. 345/157

OTHER PUBLICATIONS

*What is touch screen?—A Word Definition From the Webopedia Computer Dictionary* [online]. Jan. 18, 2002 [Retrieved on May 5, 2004] Retrieved from the Internet: <URL: http://www.webopedia.com/TERM/touch_screen.html>.

*What is light pen?—A Word Definition From the Webopedia Computer Dictionary* [online]. Feb. 13, 2003 [Retrieved on May 5, 2004]. Retrieved from the Internet: <URL: http:www.webopedia.com/TERM/L/light_pen.html>.

*What is digitizing tablet?—A Word Definition From the Webopedia Computer Dictionary* [online]. Nov. 11, 2002 [Retrieved on May 5, 2004]. Retrieved from the Internet: <URL: http://www.webopedia.com/TERM/digitizing_tablet.html>.

*LeapPad® Learning System* [online]. [Retrieved on May 5, 2004] Retrieved from the Internet: <URL: http://www.leapfrog.com/do/findproduct?id=leappad#desc_ProductDetails>.

PCT Internationa Search Report for PCT/USO4/00414.

* cited by examiner

| Region Name | Action on First Gesture | Action on Second Consecutive Gesture | Action on Third Consecutive Gesture |
| --- | --- | --- | --- |
| Volleyball | Say "volleyball" | Describe history/origin of volleyball | Open browser to www.avp.com |
| Sailing | Say "sailing" | Describe history/origin of sailing | Open browser to www.asa.com |
| Soccer | Say "soccer" | Describe history/origin of soccer | Open browser to www.fifaworldcup.com |
| Golf | Say "golf" | Describe history/origin of golf | Open browser to www.pga.com |
| Baseball | Say "baseball" | Describe history/origin of baseball | Open browser to www.mlb.com |

*FIG. 9C*

COMPUTER AND VISION-BASED AUGMENTED INTERACTION IN THE USE OF PRINTED MEDIA

PRIORITY CLAIM

This application claims the benefit under 35 U.S.C. 119(e) of U.S. Provisional Application No. 60/439,050, filed Jan. 9, 2003, the content of which is incorporated herein in its entirety.

BACKGROUND OF THE INVENTION

1. Field of the Invention

The present invention is related to vision recognition systems, and in particular, to methods and systems for vision recognition of information on printed media.

2. Description of the Related Art

For both historical reasons and human factor reasons, people are accustomed to, and enjoy interacting with printed media. For example, people enjoy reading printed books, magazines, and the like. Recently, efforts have been made to provide some degree of interactivity with printed media.

For example, there are educational toys for children that utilize books especially configured and shaped for use with specialized electronic hardware. Some systems include an electronic base that accepts solid state cartridges that correspond to specific books. The user inserts the cartridge into the base and places a corresponding configured book on the base. The user may then use an electronic pen to point to different pictures or words in the book. The electronic base will determine where the user is pointing via a grid or the like in the base, use this location information to access information from the cartridge, and respond accordingly. Other similar systems use capacitive or pressure sensors to determine the location the user is pointing at using a finger or other pointer. For example, a user can point to a word in the book using an electronic pen, the base then identifies the area to which the pen is pointing, and the base utilizes information from the cartridge, based on the identified area, to speak the word. Disadvantageously, the forgoing conventional systems generally need books specifically designed for use with the systems, and often cannot be programmed or customized by the user.

SUMMARY OF THE INVENTION

As discussed below, in one example embodiment, a computer system is coupled to a video camera or other imaging device, mounted on a stationary or a mobile platform, and provides augmented, gesture-based interaction for a human user in conjunction with the use of printed media. For example, the printed media can include books, educational materials, magazines, posters, charts, maps, individual pages, packaging, game cards, geographic maps, musical scores, product information, and the like. Using the apparatus and processes disclosed herein, users employ a natural and familiar mode of interaction, such as pointing at items of interest on printed media.

For example, computerized vision-based routines can be used to identify the printed media, to identify a position within the media (such as the current page), to track the position of a recognizable bookmark relative to the position of the printed media, to perform optical character recognition of text on the printed media, to interpret user hand and finger gestures as commands, and to track the position of the user's finger relative to the position of the printed media.

In an embodiment, a database system stores a characterization of the printed media, such as a book, including a specification of user preferences that control user interaction at various levels, such as at a book-level or a page-level, and a mapping of regions of interest on the printed page with corresponding actions. By way of example, the user can specify the language that system should use in communication with the user, the gender of the system's synthesized speaking voice, and so on. In addition, the preferences can assign system actions or responses to user gestures. By way of illustration, a preference can specify how the system behaves when a new page is identified.

By way of further illustration, a preference can specify that the system is to automatically read all of the text on a next page when a page is turned in a book. Further, a preference can specify actions to be taken when a gesture is repeated.

The information generated by the vision-based software routines is combined with the information contained in the database in real time to enable the system to provide information to the user, detect user actions, and receive user commands, based on the user's use of printed media. Further, a user can move an object, such as a pen, or a fingertip to provide visual indications to the system.

One example embodiment of the present invention provides a media and gesture recognition method using a computer system, the method comprising: viewing and generating a digital representation of a first printed media using an electronic visual sensor during a first interaction session; identifying the first printed media using the digital representation of the first printed media; retrieving information corresponding to the viewed printed media from a computer system database; using the electronic visual sensor to view at least a first finger gesture of a user relative to at least a portion of the first printed media; interpreting the first finger gesture as a first command; and based at least in part on the first finger gesture and the retrieved information, providing at least a portion of the retrieved information.

Another example embodiment of the present invention provides a vision-based method of processing user interaction with printed media, the method comprising: receiving at a computer system a digital representation of a first image of a printed media, wherein the first image was obtained from a first imaging device; based at least in part on the digital representation of the first image, retrieving corresponding information from a database; receiving a first digital representation of a first image of a user gesture relative to at least a portion of the printed media; interpreting the first digital representation of an image of a user gesture; and based at least in part on the interpretation of the user gesture and the retrieved database information, providing at least a portion of the retrieved information to the user.

Still another example embodiment of the present invention provides a computer-based printed media interaction apparatus, the apparatus comprising: an image sensor, the image sensor configured to view printed media; a database including a mapping of regions of the printed media with corresponding actions; a gesture tracking module that tracks a user gesture position relative to the printed media based at least in part on images from the image sensor; and an interaction module that, based at least in part on the user gesture position and database information, provides at least a portion of the database information to the user.

Yet another example embodiment of the present invention provides a media and gesture recognition apparatus, the apparatus comprising: an image sensor that views printed media; a recognition module that identifies the printed media based on image information from the image sensor; a database that stores information that relates portions of the printed media with corresponding actions; a gesture tracking module that identifies user gestures relative to the printed media based at least in part on images from the image sensor; and an interaction module that, based at least in part on the user gesture and database information, provides at least a portion of the database information to the user.

BRIEF DESCRIPTION OF THE DRAWINGS

FIGS. 9A-C illustrate example mappings of regions of interest on a printed page with corresponding actions.

DETAILED DESCRIPTION OF PREFERRED EMBODIMENTS

Figure 1:
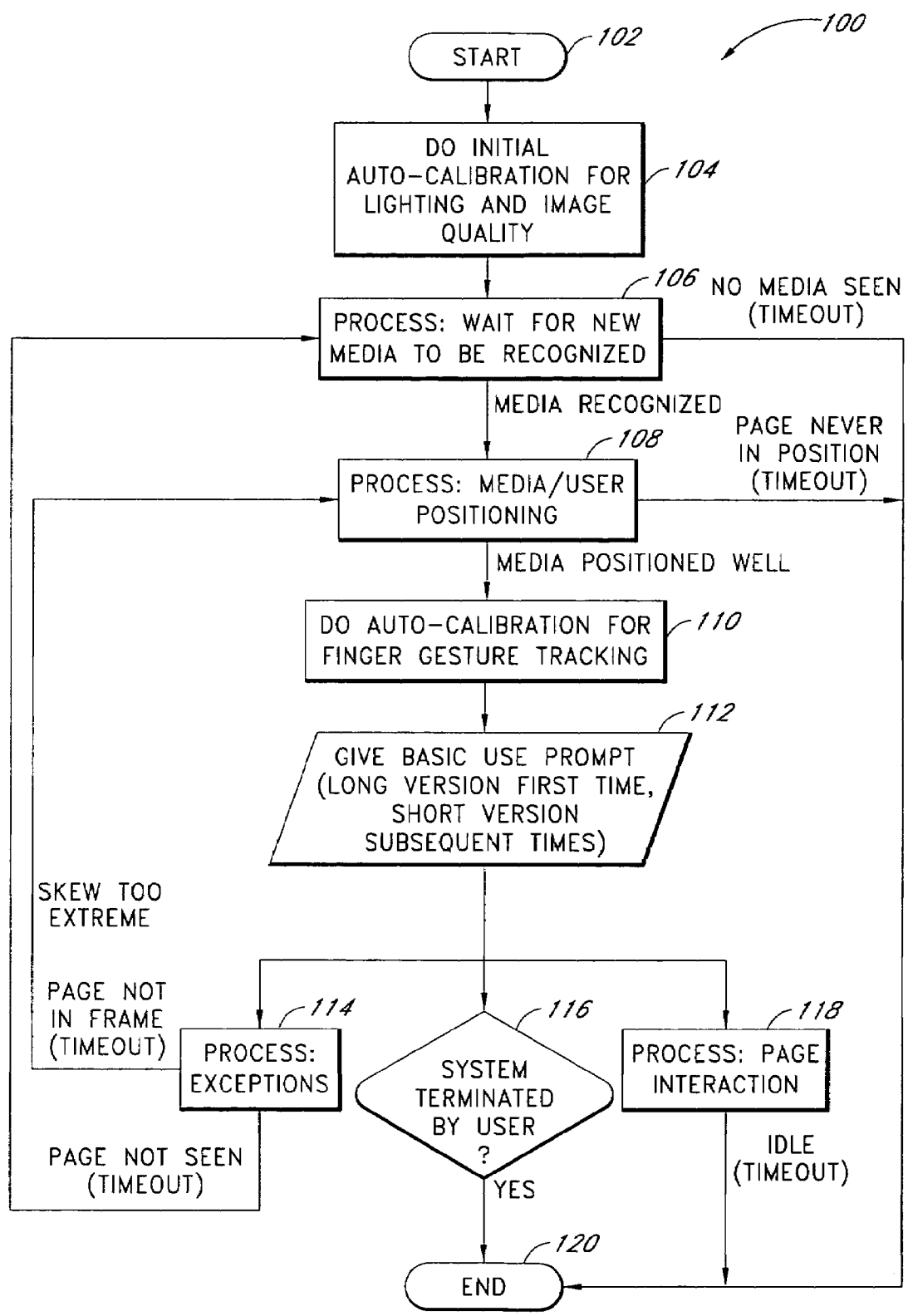
FIG. 1 illustrates an example system flow of an embodiment of a vision-based printed media interaction process.

Unless otherwise indicated, the functions described herein are preferably performed by programs including executable code or instructions running on one or more general-purpose computers or processor-based imaging systems optionally coupled to robotic systems. The computers or processor-based imaging and robotic systems can include one or more central processing units for executing program code, volatile memory, such as RAM for temporarily storing data and data structures during program execution, non-volatile memory, such as a hard disc drive or optical drive, for storing programs and data, including databases, and a network interface for accessing an intranet and/or the Internet. However, the present invention can also be implemented using special purpose computers, state machines, dedicated encoders and decoders, and/or hardwired electronic circuits.

In addition, the example processes described herein do not necessarily have to be performed in the described sequence, and not all states have to be reached or performed. In addition, the imaging system can include one or more sensors coupled to the processing unit, including for example, an image and/or video sequence capture device used to capture images of users and media. While much of the following discussion addresses the example wherein a user uses a finger to point to media, it will be understood that a user can use other pointing devices, such as a stylus, pen, pencil, or metal pointer to provide visual indications to the system.

One embodiment provides methods and systems for utilizing imaging and recognition techniques to provide augmented interaction for a human user in conjunction with the use of printed media such as books, educational materials, magazines, posters, charts, maps, individual pages, packaging, game cards, musical scores, and the like.

Vision-based routines are used to identify the printed media, a position within the media (such as the current page), to track the position of a recognizable bookmark relative to the position of the printed media, to perform optical character recognition of text on the printed media, to interpret user hand and finger gestures as commands, and/or to track the position of the user's finger relative to the position of the printed media.

A flexible and adaptable database system can store a characterization of the printed media, such as a book, including a specification of preferences that control user interaction at various levels, such as book-level and page-level, and a mapping of regions of interest on the printed page with corresponding actions. By way of example, the user can specify the language that system should use in communication with the user, the gender of the system's synthesized speaking voice, and so on. In addition, the preferences can assign system actions or responses to user gestures. By way of illustration, a preference can specify how the system behaves when a new page is identified.

By way of further illustration, a first occurrence of a gesture with respect to a first portion of media can correspond to a first action, a second occurrence (optionally within a predetermined amount of time from the first occurrence) of the gesture with respect to the first portion of media can correspond to a second action, and a third occurrence (optionally within a predetermined amount of time from the second occurrence) of the gesture with respect to the first portion of media can correspond to a third action. For example, the first instance of pointing to a word can correspond to the action of the system speaking the word, the second instance of pointing to the word within a predetermined amount of time from the first instance can correspond to the action of the system speaking the definition of the word, and the third instance of pointing to the word can correspond to the action of the system using the word in a sentence.

A dictionary can also be provided, which can be used by the system to read to the user definitions corresponding to media text. Some or all of the database contents can be provided by a user. For example, the user can provide media to be viewed by the system for which the database does not yet contain corresponding information. The system can optionally read the media, perform optical character recognition on the media text, and store some or all of the media information, including text and images of each media page, in the database for later use. The user, for example, a parent or teacher, can specify the user interaction for another user, such as a child.

The information generated by the vision-based software routines is combined with the information contained in the database in real time to enable the system to provide information to the user, detect user actions, and receive user commands, based on the user's use of printed media.

Figure 7:
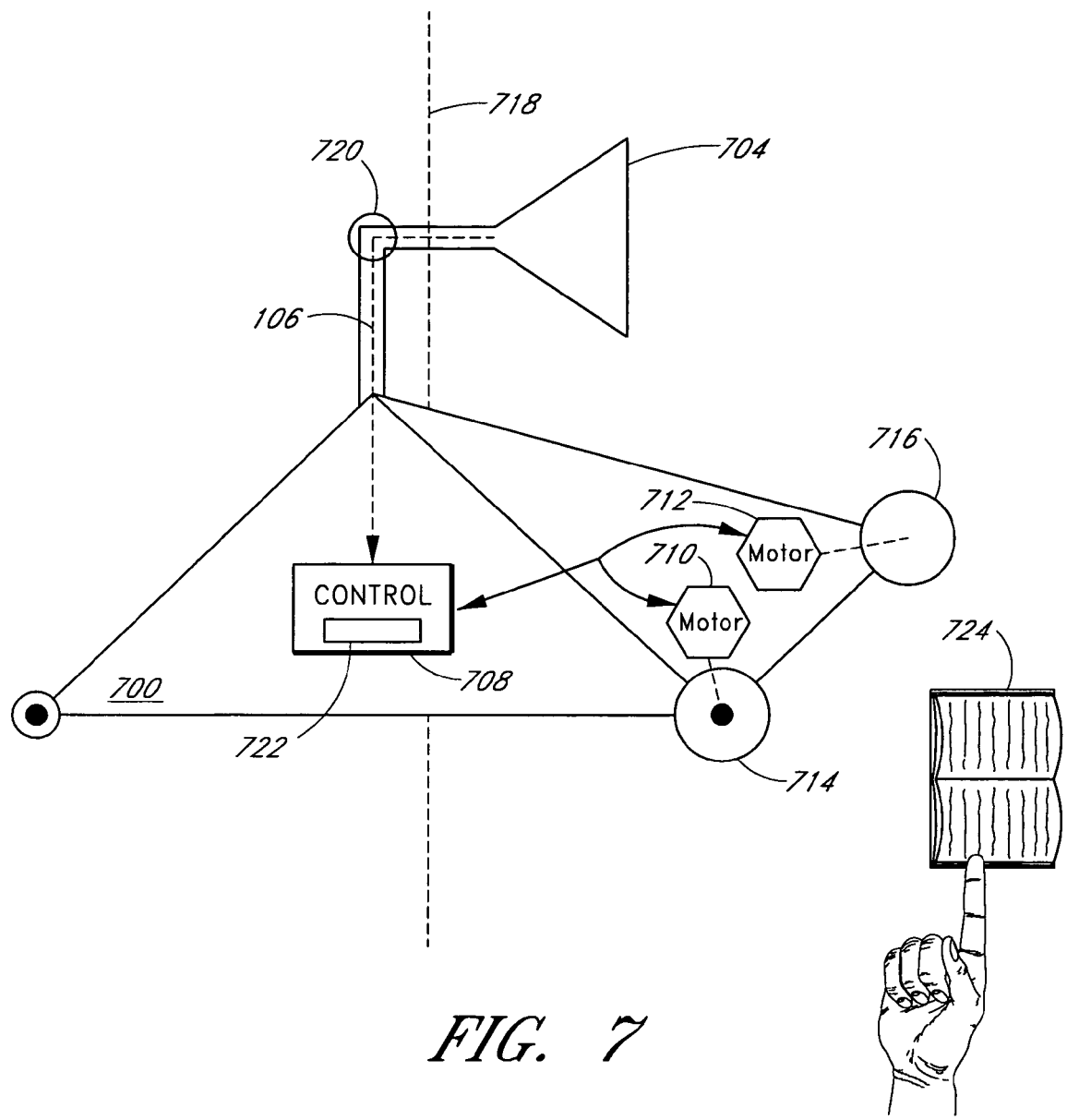
FIG. 7 illustrates an example robot system.

FIG. 7 illustrates an example of a mobile, substantially autonomous robot 700 with which a vision-based interaction system can be used, though the vision-based system can be used with other mobile platforms or in non-mobile or stationary systems as well. The illustrated robot 700 includes an imaging device or visual sensor 704, which is used to view media 724 and a user interacting with the media 724, including a user's pointing finger. The viewed image can be digital or can be converted to a digital representation. A broad variety of visual sensors can be used for the visual sensor 704. For example, the visual sensor 704 can correspond to a digital camera with a CCD imager, a CMOS imager, an infrared imager, and the like. The visual sensor 704 can include normal lenses and/or special lenses, such as wide-angle lenses, fish-eye lenses, omni-directional lenses, and the like. Further, the lens can include reflective surfaces, such as planar, parabolic, or conical mirrors, which can be used to provide a relatively large field of view or multiple viewpoints. In another example, the visual sensor 704 can correspond to a single camera or to multiple cameras.

The visual sensor 704 can include a motorized zoom under control of the control system 708, wherein the control system 708 can zoom in and out in order to ensure that the media 724, or a desired portion thereof, is fully or adequately visible to the control system 708. In one embodiment, the vision-based interaction system is advantageously configured to operate with a single camera, which advantageously reduces cost when compared to multiple cameras. Optionally, the visual sensor 704 can be coupled to one or more motors 720 controlled by the control system 708, that can rotate or pan the sensor 704 left or right, tilt the sensor 704 up and down, and to move the camera up and down relative to a floor or other surface on which the robot is placed.

The motors 710, 712 of the illustrated robot 700 are coupled to wheels 714, 716 to provide locomotion for the robot 700. Optionally, the robot can use legs, tracks, rollers, propellers, and/or the like, to move around. Digital or digitized image data 706 from the visual sensor 704 is also provided as an input to the control system 708 for the robot 700. In the illustrated embodiment, the control system 708 is coupled to motors 710, 712 to control the movement of the robot 700. For clarity, a power source for the robot 700, which can be a battery or AC power obtained from an AC outlet, is not shown in FIG. 7.

Figure 8:
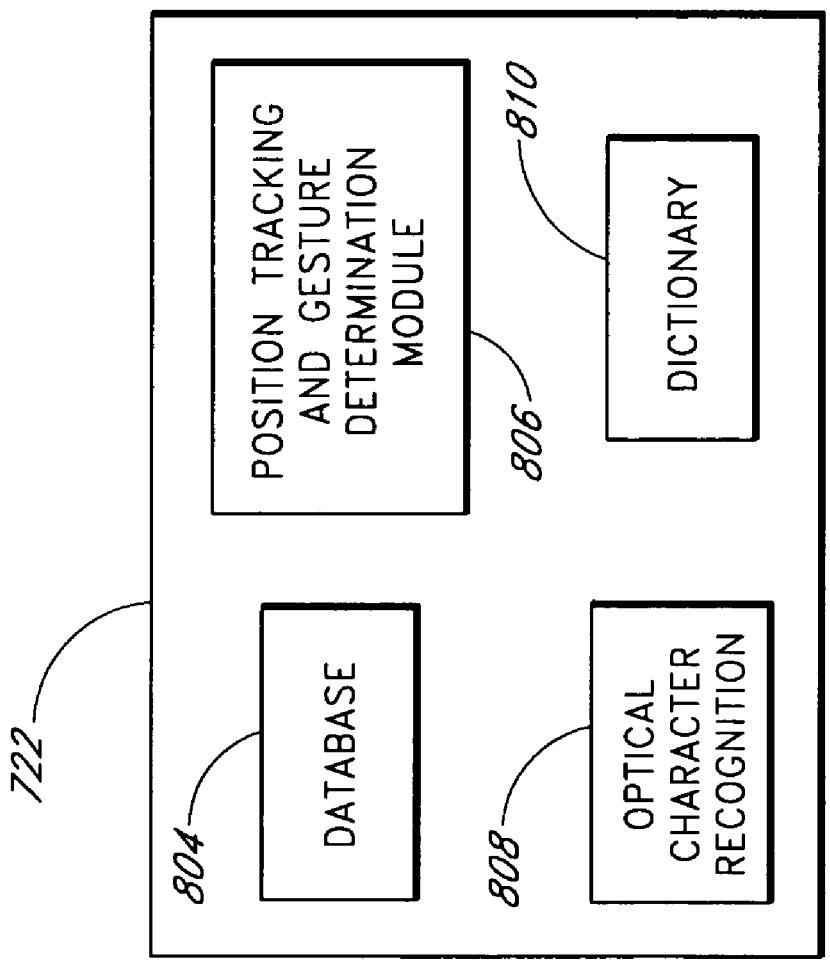
FIG. 8 illustrates an example vision-based interaction module.

In one embodiment, the vision-based interaction system is embodied as a module 722 within the control system 708. In another embodiment, the module 722 can be implemented using a non-mobile or stationary system. As illustrated in FIG. 8, the vision-based interaction module 722 can include an optical character recognition (OCR) module 808 that converts digital or digitized images of alphanumeric and other target characters into text, enabling the system to "read" text from new media, such as books, magazines, papers, and so on, even when the media text had not been previously stored in the database. The module 722 can further include a database 804 that stores a characterization of the printed media, such as a book, including a specification of user preferences that control user interaction at various levels, such as a book-level and a page-level, a mapping of regions of interest on the printed page with corresponding actions, and media text. By way of example, FIGS. 9A-C illustrate example mappings of regions of interest on a printed page with corresponding system actions.

Figure 9A:
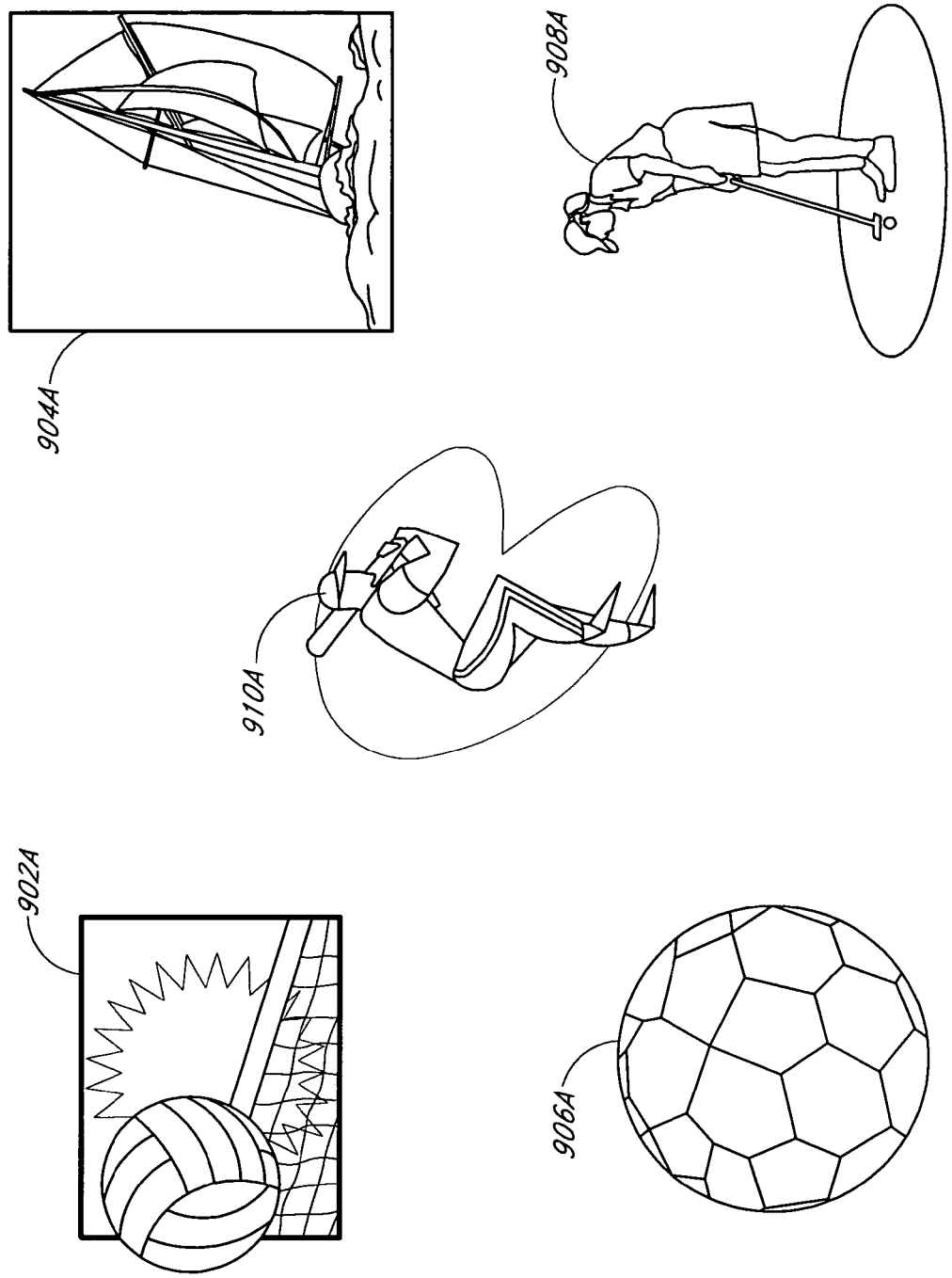
Figure 9B:
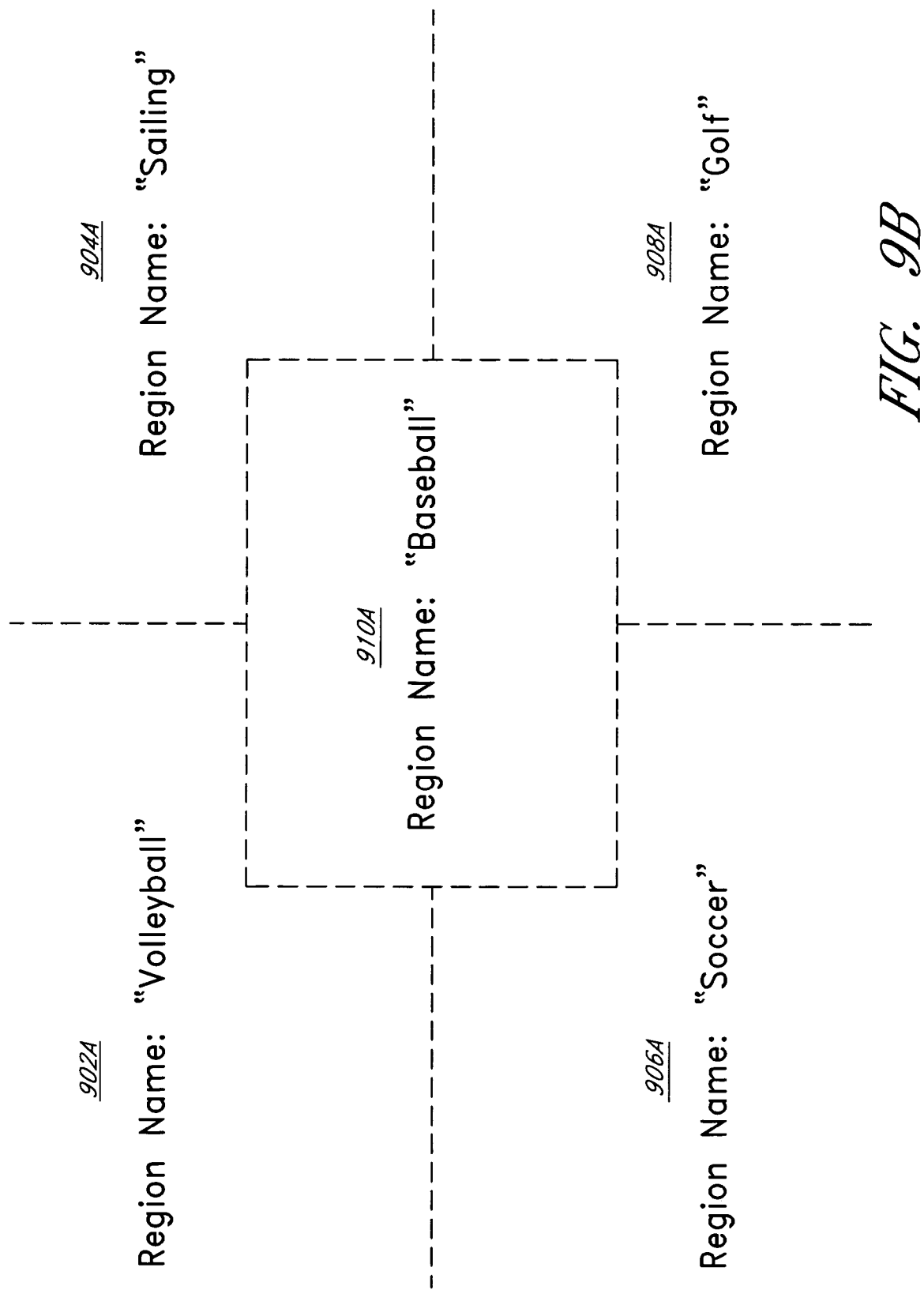

FIG. 9A includes five images, an image of a volleyball 902A, an image of a sail boat 904A, an image of a soccer ball 906A, an image of a golfer 908A, and an image of a baseball batter 910A. As illustrated in FIG. 9B, each of the images 902A-910A are mapped to defined regions having corresponding region names "volleyball," "sailing," "soccer," "golf," and "baseball". FIG. 9C illustrates a database schema and entries that maps the region names to actions performed in response to one or repeated user gestures. For example, if the user points to the volleyball region 902A, the corresponding system action is to say and/or display the word "volleyball." If the user repeats the gesture a second time with respect to the volleyball region, the corresponding system action is to describe the history and origin of volleyball using data retrieved from the database. If the user repeats the gesture a third time with respect to the volleyball region, the corresponding system action is to open a user browser to a Web page relating to volleyball and providing additional information on volleyball. Optionally, for a gesture to be considered a repeated gesture, it may have to be performed by the user within a predetermined amount of time after the previous gesture to the region, and/or without any intervening gestures with respect to other page regions or other pages. FIG. 9C illustrates similar mappings of regions, gestures, and actions with respect to regions 904A-910A.

The module 722 optionally includes an electronic dictionary 810 that can be used to access and display or read to the user definitions corresponding to selected media text. The dictionary can include one or more dictionaries. For example, a sub-dictionary can be specific to a given media work and provided by the author or publisher of the media work. Another sub-dictionary is a general-purpose dictionary. Still another sub-dictionary can be provided or programmed by a user, such as a teacher, for educational purposes. Additionally, topic-specific sub-dictionaries can be included. For example, there can be a zoology dictionary, a legal dictionary, an art dictionary, and so on. In addition, there can be a translation dictionary which can be used by the system to translate a word, words, sentences, paragraph, page, or other text groupings gestured at by the user, and the system can then speak the translated word or words. Optionally the dictionary and/or sub-dictionaries can be selected by the user and/or can be selected by the system based on the media or media title being viewed. The database 804 and/or the dictionary 810 can contain pronunciation guidelines and/or rules used by the system when reading media aloud. The module 722 can also access visual information such as images and animations, either retrieved from the database or over a network, for display to the user.

In response to the image data provided by the sensor 704, the control system 708 can provide control signals to the motors 710, 712 that control the movement of the robot 700. For example, the control system 708 can provide control signals to instruct the robot to move forward, to stop, to move backward, to turn, to rotate about a vertical axis, pan and tilt the visual sensor 704, and the like. As described herein, the robot can position itself or can be positioned in response to user commands to view media and/or to improve its view of media. For example, the robot can rotate and pan and tilt the vision sensor 704 until the printed media is viewed or adequately viewed.

The control system 708 can include hardware, such as one or more microprocessors, volatile memory, non-volatile memory, mass storage memory, etc., can include firmware, can include software, can include network communication equipment, and the like. In one embodiment, the control system 708 uses dedicated hardware, such as one or more single-board computers, application specific integrated circuits (ASICs), field programmable gate arrays (FPGAs), and the like.

In one embodiment, the control system 708 is implemented using a general-purpose computer, such as a laptop computer, and by software executing in the computer. The control system 708 can be coupled to the motors via digital-to-analog converters and motor controls. In addition, the control system 708 can receive analog feedback from the motors, such as for monitoring motor currents, bump sensors, and other robot analog devices via one or more analog to digital converters. In one example, the control system 708 can include a laptop computer with an Intel® Pentium® 4 processor with a 2.4 GHz clock speed. However, other processors executing at other clock speeds can be used as well. The laptop, or other computer system, can include a keyboard for entering data and commands, and a display and speaker for providing prompts, instructions, data, and for verbally reading media to the user. In addition, the laptop or other computer system can include a microphone that can be used to receive commands and data from the user. The computer system can include a speech synthesis system to generate spoken words and/or can electronically store spoken words, sentences, and phrases used when providing prompts, instructions, data, and other audible material to the user. In addition, the system optionally includes a MIDI or other music synthesizer to play music, such as that read from or corresponding to musical scores. The software, including example vision-based interaction software processes discussed below, can include instructions and modules that are embodied in a tangible medium, such as a hard disk or an optical disk. Data processing for the robot 700 can be performed entirely within the robot 700 such that the robot 700 is autonomous, or the data processing can be performed partially outside the robot 700. For example, the control system 708 can be configured to relay data to another computer, via a network such as a wireless network, where a portion of the data processing takes place. In addition, the robot can retrieve information related to a given printed media from another computer over the network or over the Internet.

Optionally, the robot 700 can include a support platform for supporting printed media, such as books or magazines. In addition, the robot 700 can include one or more hands, claws, pincers, or other grasping mechanisms that can hold printed media.

FIG. 1 indicates an example vision-based interaction system process flow 100 which can be implemented using the robot 700 illustrated in FIG. 7. The system can capture and digitize one or more still and/or video images via an visual sensor, such as sensor 704, evaluate the digital image or images in real-time to determine appropriate interaction with the user, diagnose, correct, and/or report to the user difficulties the system is having, and automatically calibrate and adjust or optimize settings for a variety of conditions, such as lighting conditions, image quality, and user attributes such as fingertip color and gesture speed.

The process can be initiated, by way of example, by a user providing a start command via a keyboard, touch screen entry, voice command, and the like. Optionally, the presence of certain media within a certain range of the system can trigger the process. For example, an object recognition process analyzes the incoming image stream on a frequent basis, such as several times per second. When the object recognition process identifies a match, such as when an object found in the image stream corresponds to an object in a database of recognizable objects, a recognition occurs and the interaction process is triggered. The user can initially be instructed to place the media of interest within the view of the visual sensor 704. For example, the user can be instructed to place the media on a support platform associated with the system, on a floor, table, or user's lap in front of, or directly underneath, the visual sensor lens, or other appropriate location. Beginning at start state 102, the process proceeds to state 104, where an initial auto-calibration is performed for lighting and image quality. By way of example, the auto-calibration process can include adjusting the incoming image stream from the imaging device by applying filters so that it can be adequately or optimally processed by the system. Thus, for example, auto-brightness, auto-contrast, auto-levels, auto-focus, and the like can be performed. By way of example, if the incoming image stream is generally too dark, the system might adjust and filter the image information to have a uniform level of brightness and/or the system can increase the image contrast. Optionally, when used with a mobile platform and/or in an embodiment where the visual sensor has pan and tilt control, the visual sensor can be periodically pointed at a printed reference image to aid in the calibration. The reference image can be attached to the mobile platform, within the pan/tilt view of the visual sensor, or located at a known or determinable location displaced from the mobile platform.

The process proceeds to state 106 and waits for new media, such as a book or magazine, to be identified via a media identification process discussed in greater detail below with respect to FIG. 2. If after a predetermined amount of time no media is seen, the process times out and proceeds to end state 120.

If media is recognized at state 106, the process proceeds to state 108, and a media and/or user positioning process is performed, as discussed in greater detail below with respect to FIG. 3. Optionally, if the system is autonomous, the system can repeatedly reposition itself as needed in order to, or in attempting to keep the proper relative positioning of the visual sensor and the media so as to keep the media in proper view. If a media page is not adequately positioned, the process times out and proceeds to end state 120. If the media page is in a correct position, the process proceeds to state 110. At state 110, auto-calibration is performed for finger gesture tracking. For example, the finger gesture tracking auto-calibration can include color balancing, motion blurring, or adjusting selected system settings based on the imaging device's shutter speed. The user can be instructed to perform example gestures within view of the visual sensor for calibration purposes. For example, the requested gestures can include one or more sweeps of the fingertip or pointing device across the page.

At state 112 the user is prompted using selected initial prompts. For example, if the system is presented with a book, magazine or other media, the prompt can include the name of the media and instructions retrieved from the database, and what actions, including what initial action, the user is to perform. By way of example, if the media is a book, the system can provide the prompt: "Turn to the next page"; or "The Cat in the Hat, by Dr. Seuss . . . Turn to page 5."

By way of further example, if the media is a Bloomingdale's holiday season catalog for 2003 or other catalog, based on the corresponding instructions retrieved from the database, the system can provide table of contents or indexing information. For example, the system can prompt the user as follows: "This is Bloomingdale's holiday season catalog for 2003. Women's clothing and accessories begin on page 2. Men's clothing and accessories begin on page 24. Home furnishings begin on page 36." Similarly, the system can provide further prompts regarding how to place an order, how to obtain additional information about an item, and so on.

Optionally, the system can give lengthier, more explicit prompts the first time, or the first few times the system is utilized by a given user, and can thereafter give briefer prompts as the user becomes more familiar with the system and process.

The process then executes states 114, 116, 118, and monitors exception conditions, page interactions, and termination commands. State 114 corresponds to an exception condition, wherein the process cannot successfully interact with the media, because, by way of example, the media page is not seen, or not sufficiently seen in the image frame. The exception handling process is described in greater detail with respect to FIG. 5. If a timeout condition occurs because the page was not seen or was not adequately seen in the image frame for a predetermined amount of time, the process correspondingly returns to state 106 and 108. If the user terminates the process, such as by giving a termination or off command or indication, the process proceeds from state 112 to state 116. Page interaction state 118 is discussed in greater detail below with respect to FIG. 4. As discussed below with respect to FIG. 4, if the user does not take any action and/or respond to prompts for a predetermined amount of time, the process proceeds to end state 120.

Figure 2:
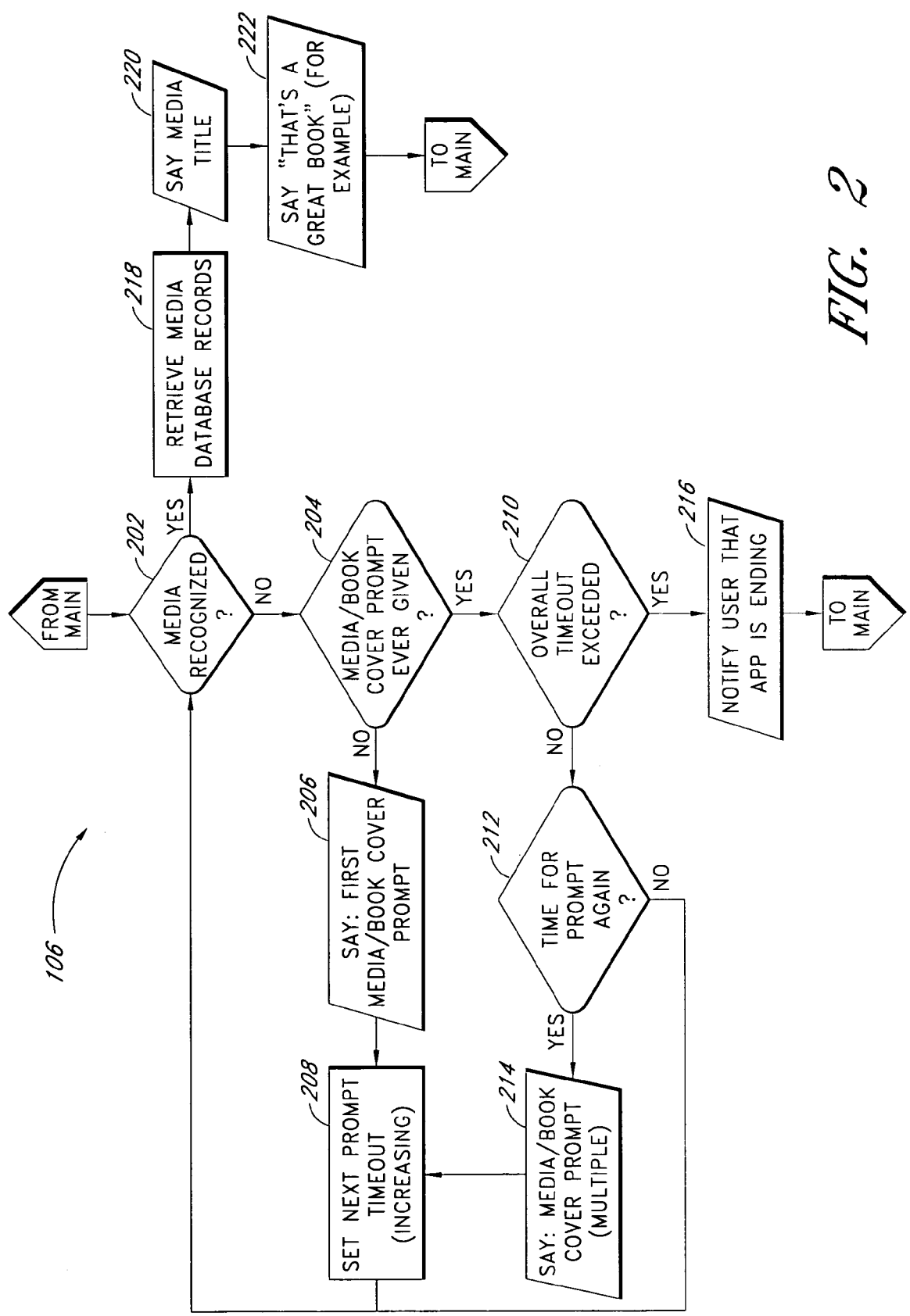
FIG. 2 illustrates an example process for identifying media.

With reference to FIG. 2, the example process performed during the media identification state 106 will now be described in greater detail. At state 202, a determination is made as to whether the media has been recognized. In one implementation of the system, a predefined media database exists with information pertaining to one or more volumes of printed media, such as individual books. The system identifies the media that is currently in the image frame. In one example implementation of the system, the media identification is made using vision-based object recognition on the media's cover image. By way of example and not limitation, the object recognition process can optionally be performed using a scale-invariant feature transform (SIFT), which is described in *Object recognition from local scale-invariant features*, David G. Lowe, International Conference on Computer Vision, Corfu, Greene (September, 1999), pp. 1150-1157, as well as in *Local feature view clustering for 3D object recognition*, David G. Lowe, IEEE Conference on Computer Vision and Pattern Recognition, Kauai, Hi. (Dec. 2001), pp. 682-688.

In addition or alternatively, the media is recognized by analyzing a printed code, such as a bar code, color code, or an ISBN number recognized, scanned or viewed using the visual sensor, a bar code scanner, or other appropriate scanner. After the media has been recognized, at state 218, the appropriate database records can be retrieved from the media database. At state 220, a media identifier, such as a book title, is verbally enunciated, and/or displayed via a display, by the system. For example, if the media is a book, such as "The Cat in the Hat," the initial prompt can be "The Cat in the Hat, by Dr. Seuss." At state 222, other statements or remarks can be enunciated and/or displayed by the system. For example, the name of the media's author can be spoken or displayed by the system. By way of further example, background to the media, such as the year it was written, other works written by the author, introductory comments by critics, and/or encouraging remarks, such as "great book!" can be retrieved from the database or over a network, enunciated and/or displayed. The process then proceeds to state 108, as illustrated in FIG. 1.

Referring still to FIG. 2, if, at state 202, the media is not recognized, the process proceeds to state 204, and a determination is made as to whether the user has previously been prompted to place the media or book cover within the view of the system imaging device. If not, the process proceeds to state 206 wherein the user is prompted to place the media or book cover within the view of the system imaging device. At state 208 a timeout prompt time is set. Optionally, the timeout prompt time is increased as compared to the previous timeout prompt time so as to give the user additional time to comply with the prompt. The process then proceeds back to state 202, where a determination is made as to whether the media has been recognized.

If, at state 204, a determination is made that the prompt has been given, the process proceeds to state 210, and a determination is made as to whether an overall predetermined timeout period has been exceeded, indicating that it is unlikely that the media will be recognized. The overall predetermined timeout period can correspond to a predetermined number of attempts or prompts. If, at state 210, the overall timeout time has not been exceeded, the process then proceeds to state 212, a determination is made as to whether a predetermined time has elapsed, indicating that it is time to again provide the prompt provided at state 204. If it is time for the prompt, the process proceeds to state 214, where the prompt is again provided. If the user does not respond, the prompt can be provided multiple times. The process then proceeds to state 208, where the next timeout time is set.

If, at state 210, the overall timeout time has been exceeded, the process then proceeds to state 216, where the user is notified that the session, process and/or application is ending. The process then proceeds to end state 120, as illustrated in FIG. 1.

If, at state 212, it is not yet time for another prompt, the process proceeds to state 202, where the media recognition process is performed again.

To enhance the ability to recognize a page, to relatively accurately determine a position of the page, and to relatively accurately determine the position of the user's fingertip, the printed media is preferably within the image frame and is preferably presented to the camera at such an angle so as to reduce skew and other distortion. One embodiment of the process described in connection with FIG. 3 can be used to position the visual sensor. For a mobile platform, such as the robot 700 and/or a pan-tilt visual sensor, one embodiment of the system preferably moves the mobile platform, positions the visual sensor, and/or zooms the visual sensor in or out to achieve an acceptable position. After the platform has been moved, the system can provide iterative prompts to the user to direct the user to change the position of the system and/or the printed media. For example, the user may be prompted to move the printed media left, right, forward, back, up, or down until an acceptable position has been achieved. The system can also account for skew when moving the camera and directing the user's movements. The platform movement operations may not apply where the camera is attached to a stationary platform. Similarly, the camera pan-tilt and/or zoom operations may not be applicable where the camera does not have the capability to perform the foregoing operations.

Figure 3:
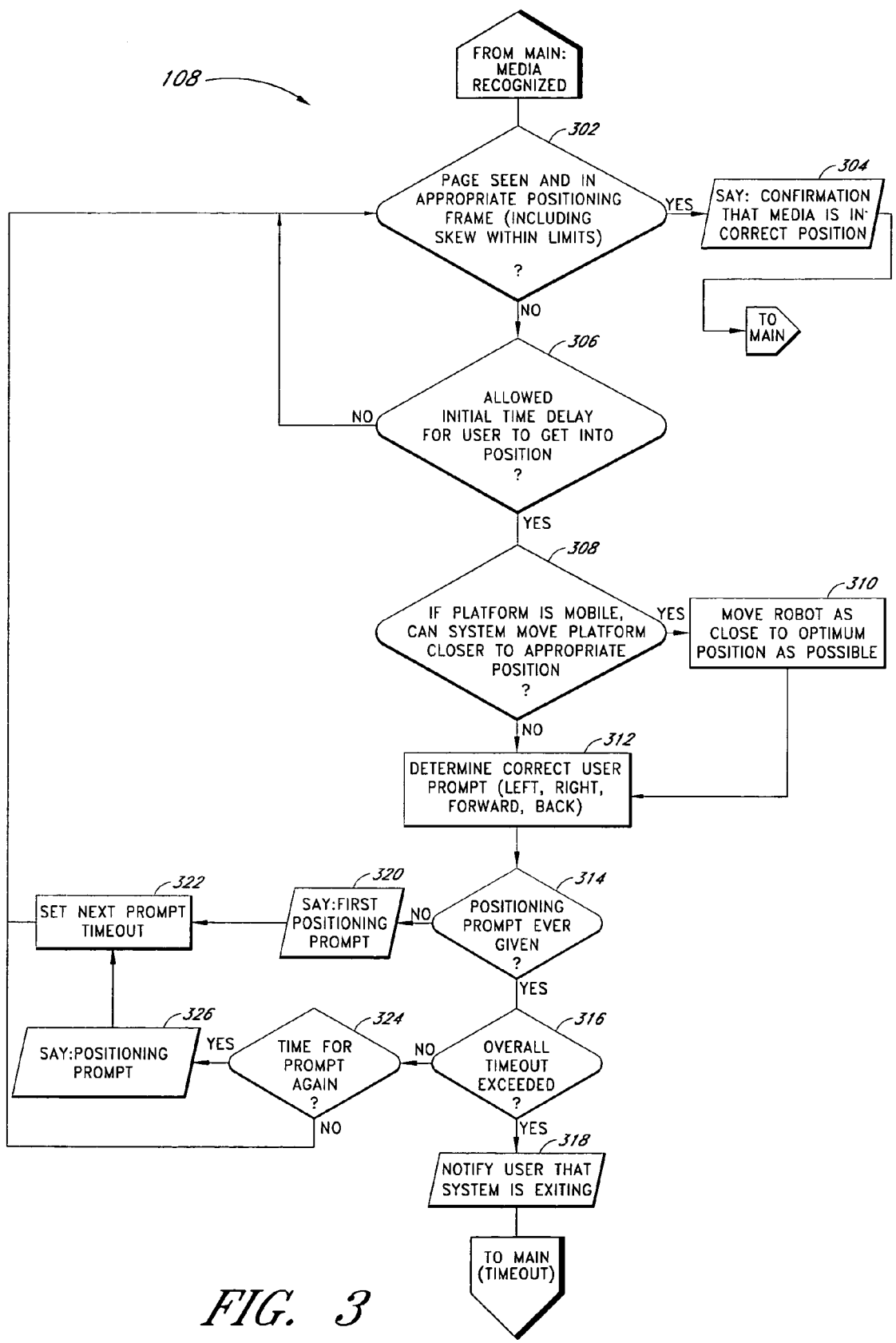
FIG. 3 illustrates an example process for positioning an imaging device.

With reference to FIG. 3, the positioning process 108 begins at state 302, wherein a determination is made as to whether the media page or cover has been viewed by the imaging device or visual sensor and is appropriately positioned in the image frame. For example, the skew of the page or cover can be inspected to determine if it is within acceptable limits. While skew can at least partly be corrected via software image processing and rotation of the image, in some embodiments, there may be a processing limit on how much skew can be corrected, and accordingly on the acceptable amount of skew. In addition to skew, the process can detect whether or not the printed media page is entirely contained within the field of view of the visual sensor and/or whether the page is close enough to the visual sensor so that the page substantially fills the field of view of the visual sensor. If the page has been viewed and the skew is within acceptable limits, the process proceeds from state 302 to state 304, where a confirmation indicating that the media is correctly positioned is provided or enunciated to the user. The process then returns back to the main process illustrated in FIG. 1.

If the page has not been viewed by the imaging device, or if the page is not within acceptable skew limits, the process proceeds from state 302 to state 306, where a determination is made as to whether an initial time allocated for correctly positioning the media has expired. If the allocated time has not expired, the process proceeds from state 306 back to state 302. If the allocated time has expired, the process proceeds from state 306 to state 308, where, if the imaging device platform is a mobile platform, such as a computer-controlled mobile robot, a determination is made as to whether the robot can be moved so as to improve the imaging device position with respect to viewing the media. If the robot can be moved to a better position, the process proceeds to state 310, where the robot is moved into an improved position with respect to viewing the printed media. The process then proceeds to state 312, where a determination is made as to what further movement is needed to correctly position the media. For example, a determination is made as to whether the user should move the media to the left, right, forward, backward, and/or rotate the media so as to correct for skew. If, at state 308, a determination is made that the robot cannot be moved so as to improve the view of the media, the process proceeds to state 312.

At state 314, a determination is made as to whether the system has already provided the user with a positioning prompt. If not, the process proceeds from state 314 to state 320 and a first positioning prompt is provided to the user. The process proceeds from state 320 to state 322 where a prompt timeout time is set. The second time this state is reached, the timeout time is optionally set to a longer time than the first time the state is reached. The process then proceeds back to state 302.

If, state 314, a determination is made that the system has already provided the user with a positioning prompt, the process proceeds to state 316, wherein a determination is made as to whether the overall or cumulative timeout time has been exceeded. If the timeout time has not been exceeded, the process proceeds to state 324, where a determination is made as to whether it is time for another user prompt. If it is time, the process proceeds from state 324 to state 326, where another user prompt is provided. If, at state 316, a determination is made that the overall timeout time has been exceeded, the process proceeds to state 318 where the user is notified that the system is exiting the process or application, and/or shutting down. The process then returns to the process illustrated in FIG. 1.

Figure 4:
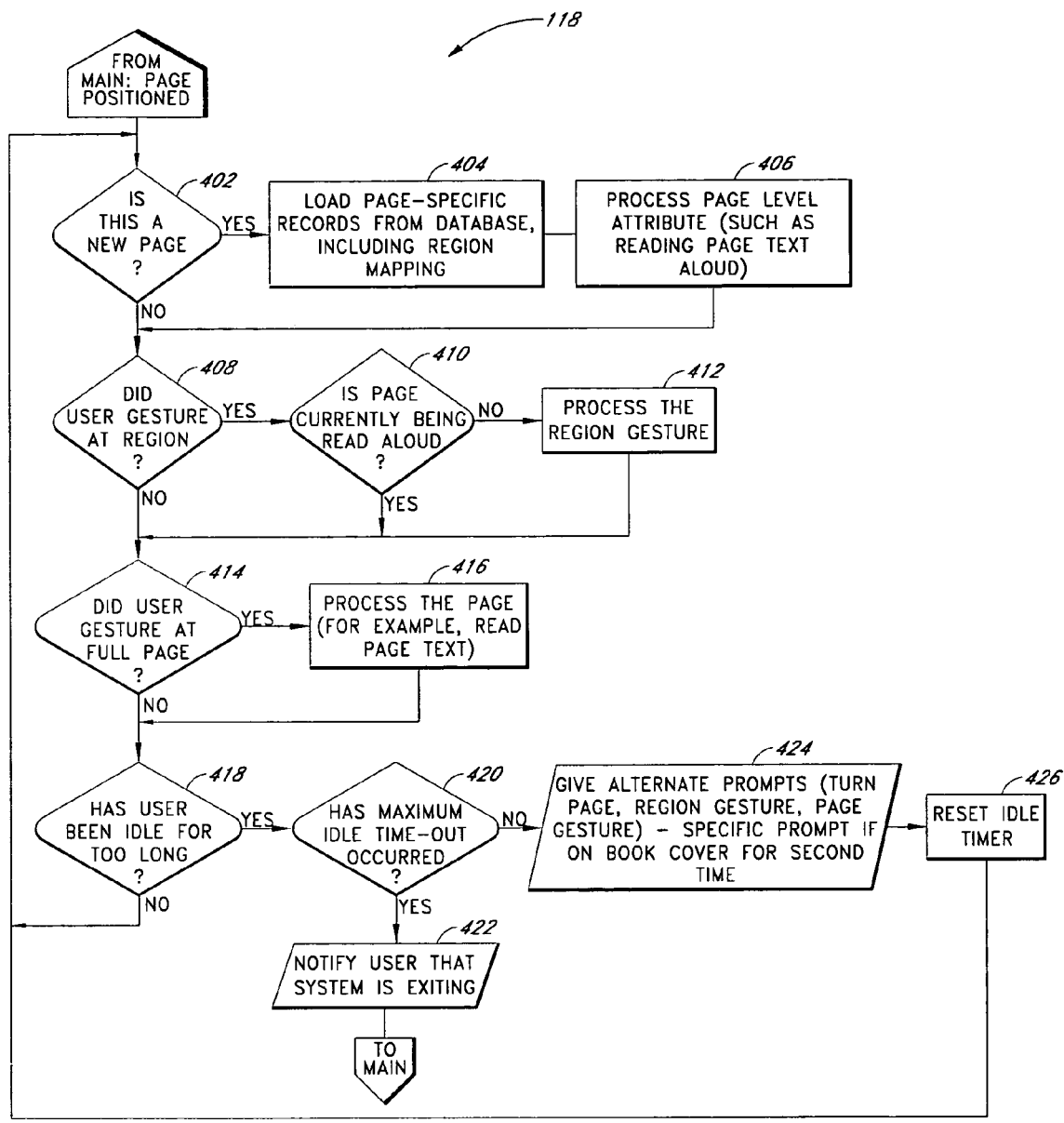
FIG. 4 illustrates an example page interaction process.

FIG. 4 illustrates page interaction state 118 in greater detail. As will be discussed below, after the system determines that the printed media is in an acceptable position, the system initiates a process of providing interaction with the user as the user manipulates the printed media, such as by turning pages, the user uses finger and/or hand gestures to request certain actions, the user uses a pointing device or fingertip gesturing to indicate regions of interest on the current page, and the like. For example, the user can diagonally sweep the fingertip or pointing device across the page to instruct the system to read the page text aloud. By way of further example, the user can move his fingertip back and forth beneath a given word to indicate that the word should be read aloud by the system. The user can repeatedly move a finger across a word to instruct the system to state and spell the word. By way of example, if the user taps on a word, the system can provide a definition of the word retrieved from an electronic dictionary. By way of further example, a user can "draw" a circle with a finger or other pointer around a word, sentence, figure, or other object, and the system will respond with the appropriate mapped action. Optionally, after the gesture is interpreted by the system, the system can audibly or visually tell the user what the action the system thinks the user wants the system to perform and ask the user to confirm that the corresponding action is to be taken. If the system cannot definitively determine which gesture the user has made, the system can list the potential actions that might correspond to the user gesture and ask the user to select, via a keyboard, verbal command, or another gesture, the desired action.

If a corresponding media database file or record exists for the current media, the system identifies the current page (within a book, for example) and relatively accurately determines its 3-D coordinate position. In one implementation, object recognition is used both to identify the page and to determine the page's position. After the page position is known, coordinates provided by the fingertip tracking subsystem, or coordinates of the user's bookmark, can be translated into the page space so that a correct database lookup (for page region-related information) can be achieved. Optionally, the coordinates of the user's bookmark are also determined using object recognition. In addition or instead, a specially coded bookmark, such as a bar code, a color code, a colored bar code, a colored and/or coded sticker, and/or the like, is used.

Additional types of interactivity can be triggered by physical features of the printed media itself. For example, one embodiment of the system can detect that a user has lifted the flap over a hidden image, such as in a children's book, or can determine the positions of the hands of a clock in a book that teaches telling time. Interactivity can also be initiated by the system itself, rather than in response to action from the user. For example, a user can be prompted to gesture at the correct answer on a page, or to point at a given object in a hidden picture book. Via visual observation, the system then detects whether the user has pointed to the correct answer or object, and if so, congratulates the user. If the user has not pointed to the correct answer or object, the system can provide encouraging prompts, such as "give it another try," and/or hints.

Beginning at state 402, a determination is made as to whether a new page is being viewed. The determination can be made based on page features or codes that can be uniquely or separately identified. The determination can be made, by way of example, by comparing two or more images of the media, and determining that a different page is now being viewed as compared to the page in a previous frame. By way of further example, when object recognition is used, representations of features of each page, or one or more salient portions of each page, are stored in the object recognition database, and the system determines the current page by matching representations of features of the page image from the camera with the stored representations of features. Thus, the features can act as fingerprints for pages or portions of pages. The "new page" determination is made when the visual sensor sees an object that corresponds to a different page than the page currently loaded, if any. In addition or instead, different bar codes or color codes on each page can be viewed or scanned to determine if a new page is being viewed.

If the page is a new page, the process proceeds to state 404, and corresponding page-specific records are loaded from the system database. For example, the records can include characterization of the printed media, such as a book, including a specification of user preferences that control user interaction at various levels, such as a book-level and a page-level, and a mapping of regions of interest on the printed page with corresponding actions.

At state 406, page level attributes are processed. For example, the record can specify that the page is to be read by the system using spoken words. If, at state 402, a determination is made that the page is not new, or if state 406 has been performed, the process proceeds to state 408. By visually observing the user's hand and/or fingers via the imaging device, at state 408, a determination is made as to whether the user gestured with respect to a page region, such as by pointing at the region using the user's finger. The region, by way of example, can selectively encompass a letter, word, a line, a sentence, a paragraph, a flap, a picture, a figure, other image, or the like.

If the user did gesture at the region, the process proceeds to state 410 and a determination is made as to whether the system is currently reading the region to the user. If the system is currently reading the region to the user, the system proceeds to state 414. If the system is not currently reading the region to the user, the system proceeds from state 410 to state 412, where the gesture is processed. At state 414 a determination is made is to whether the user gestured at the full page, such as by diagonally sweeping a fingertip or pointing device across the page. If the user did gesture at the full page, the process proceeds to state 416 and performs the corresponding action. The corresponding action can depend on the type of media being viewed. For example, if the media is a page, the action can be reading the page text or the page title. If the media is a musical score, the system can play the scored music. The process then proceeds to state 418. If the user did not gesture at the full page, the process proceeds from state 414 to state 418. At state 418, a determination is made as to whether the user has been idle and has not taken any action, such as gesturing or providing the system with any instructions, for a predetermined amount of time. If the user has not taken any action within the predetermined amount of time, the system proceeds to state 420 where a determination is made as to whether the maximum idle timeout has occurred. If the maximum timeout has occurred, the process proceeds to state 422, and the user is notified that the system is exiting the interaction process and/or shutting down. If at state 420 the system determines that the maximum timeout has not occurred, the process proceeds from state 420 to state 424, and the system gives the user audible and/or displayed prompts in an attempt to induce user interaction. For example, the user can be prompted to turn to another media page or asked to make a gesture with respect to a page region or with respect to the full page. By way of further example, if the system is viewing a book cover for a second time in a session, the system can revert to the prompts used when the system initially viewed the book cover. The process then proceeds from state 424 to state 426, at which point the idle timer is reset. The process proceeds from either state 418 or state 426 to state 402.

Figure 5:
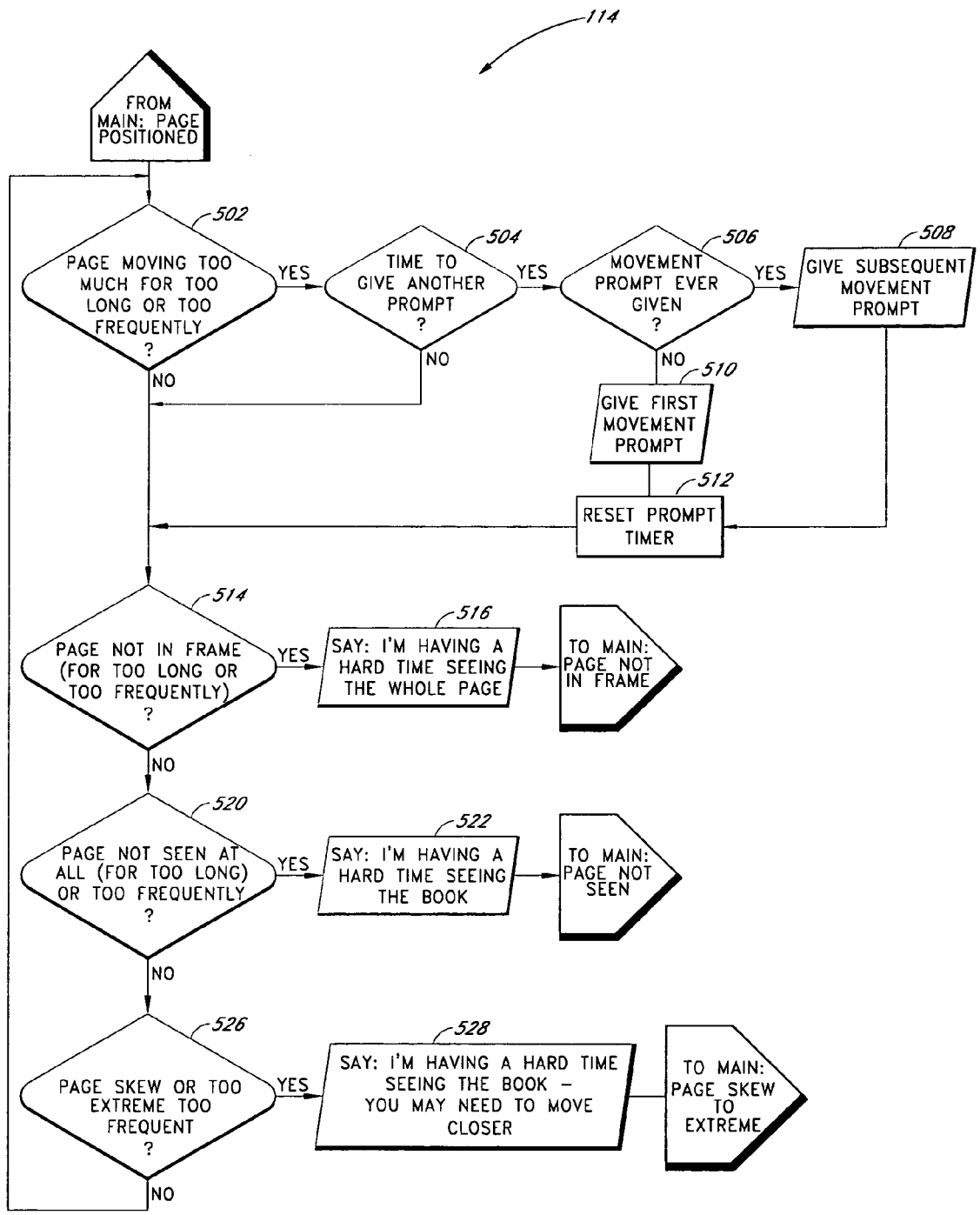
FIG. 5 illustrates an example exception handling process.

Referring now to FIG. 5, the user exception handling state 114 illustrated in FIG. 1 will now be described in greater detail. In parallel with page processing, the system can also monitor itself for possible points of failure or user exceptions. When an error, sub-optimal, or undesired situation is detected, the system can invoke correction procedures. When such correction is not successful, the system can report the problem to the user to provide troubleshooting information. Monitored and reported conditions can include excessive or frequent movement of the page, which can make it difficult to track fingertip gesturing relative to the page position, movement of the page out of the image frame, failure of the system to identify the page, excessive skew of the page image relative to the camera plane, and the like.

At state 502, a determination is made as to whether the user is manipulating the media in such a manner as to make it difficult for the system to track user gestures, such as by moving the page an excessive amount, such as more than a predetermined distance relative to an initial page coordinate, or too frequently. If, at state 502, a determination is made that the user is not manipulating the page or media in a problematic way, the process proceeds to state 514. If, at state 502, a determination is made that the user is manipulating the page or media in a problematic way, the process proceeds to state 504 where the user is directed to stop the problematic manipulation and/or to take corrective action. For example, the user can be audibly requested to stop moving the page so much.

At state 506, a determination is made as to whether the system has provided a prompt regarding correcting or ceasing excessive movement, such as a cease movement prompt, yet. Optionally, other prompts, such as a rotate page prompt, a rotate media prompt, a move media forward prompt, a move media backwards prompt, a move media to the left prompt, or a move media to the right prompt, can be provided as well. If the user has been provided with a movement prompt, the system proceeds to state 508, wherein the user is given an additional movement prompt, which for example, can be a corrective prompt including one or more of the foregoing prompts.

If, at state 506, a determination is made that the user has not been provided with a movement prompt, the system proceeds to state 510, wherein the user is given a first movement prompt for the session. The process proceeds from either state 510 or state 508 to state 512, and the prompt timer is reset.

The process proceeds from state 502, 504, or 512 to state 514. A determination is made at state 514 as to whether the page is not completely or adequately in the image frame, has not been completely or adequately in the frame for more than a predetermined amount of time, and/or the page has been moved partially out of the frame at higher than an acceptable frequency, the process proceeds to state 516. At state 516 the system, audibly and/or via the system display, informs the user that the system is having difficulty seeing or viewing the entire page and/or a portion of interest. The process then proceeds to state 108, as illustrated in FIG. 1.

If a framing problem is not detected at state 514, the process proceeds to state 520, at which a determination is made as to whether the page has not been within the imaging device's view for more than a predetermined amount of time, and/or at higher than a predetermined frequency, and if so, the process proceeds to state 522. At state 522, the system audibly and/or via the system display informs the user that the system is having difficulty seeing or viewing the book. The process then proceeds to state 106, as illustrated in FIG. 1.

If a viewing problem is not found at state 520, the process proceeds to state 526, at which a determination is made as to whether the page skew is greater than a predetermined amount or has been skewed with a greater than predetermined frequency, and if so, the process proceeds to state 528. At state 528 the system, audibly and/or via the system display, informs the user that the system is having difficulty seeing or viewing the book and can ask the user to move the book closer to the imaging device, rotate the book in a first direction by a first angle, or provide the prompts discussed above with respect to state 506. The process then proceeds to state 108, as illustrated in FIG. 1.

Figure 6:
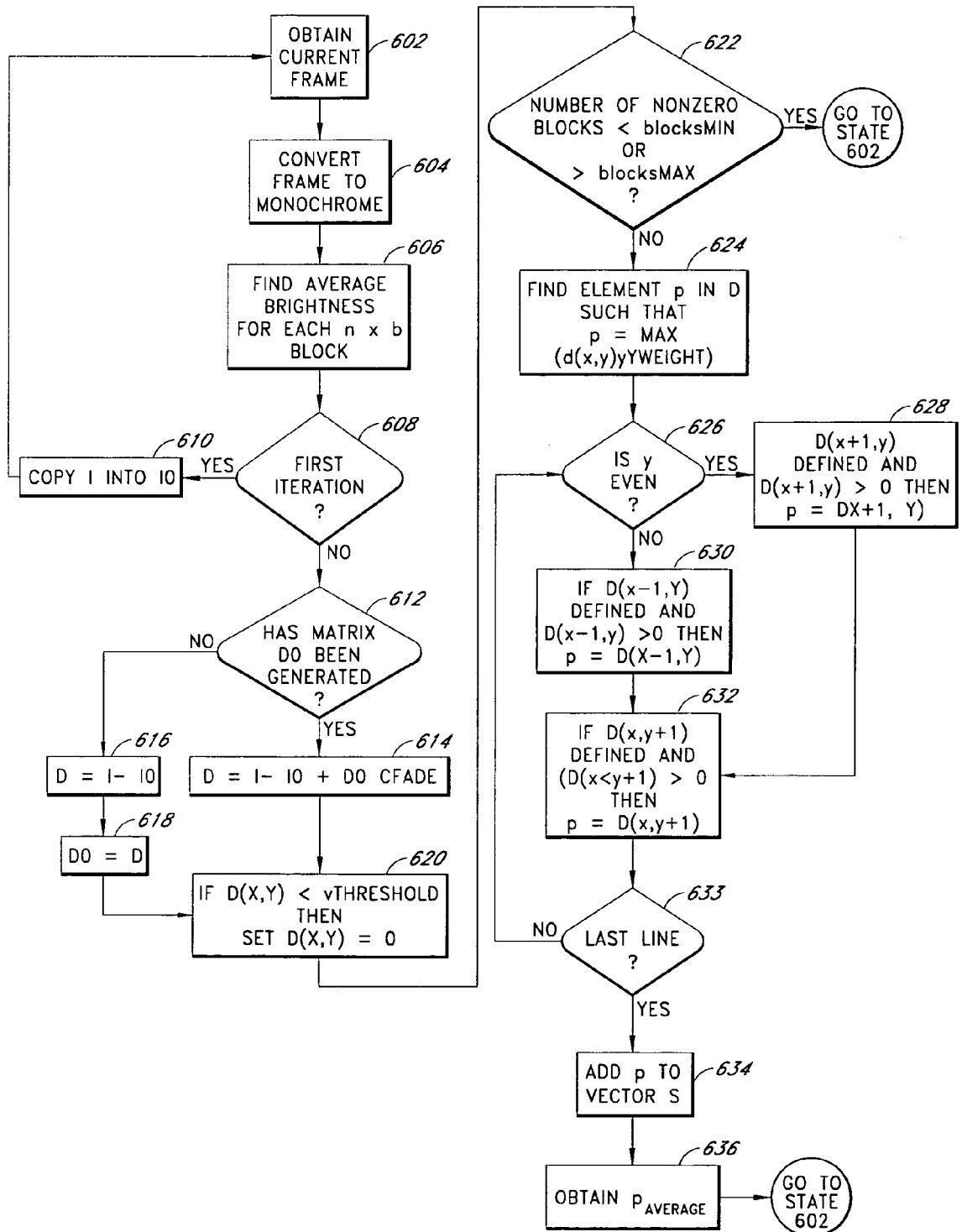
FIG. 6 illustrates an example motion difference process.

Fingertip position tracking and gesture determination will now be discussed in greater detail with reference to FIG. 6. In particular, FIG. 6 illustrates an example tracking method that can be used to track the user's fingertip position and/or page changes. The method compares successive frames (images) from the video feed captured by the visual sensor and uses the difference between successive frames to detect motion. It will be understood that frames can be dropped and that frames that are relatively close, but not adjacent, in sequence can be compared to detect motion. In one example implementation, pixels that change in brightness from frame to frame more than a first threshold correspond to movement in the camera's field of view. Optionally, the system also detects changes in color information from frame to frame. The system can then apply heuristics regarding position and movement to determine a point that is likely to be the tip of a user's finger, and thus the point indicated by the user's gesture.

The process can subtract the currently provided video frame from the previous frame. Before this is done, the image representing the frame, which can be provided in RGB color space, can be converted to monochrome by averaging the red, green, and blue brightness for each point that is used. A matrix is then created containing the average pixel brightness for each n×m block, such as 5×5 or 7×7 blocks. The matrix generated from the previous frame is subtracted from the matrix from the present frame, yielding a difference matrix. In one example embodiment, this difference is added to the previously obtained difference matrix, after the previous difference matrix is "faded" by multiplying it by a scalar percentage. In order to reduce noise, blocks beneath a predetermined threshold can be discarded, such as by setting the block values to zero. Also, difference matrices with too many over-threshold blocks, indicating movement of the page or of the camera itself, can be discarded, as well as matrices with too few over-threshold blocks (indicating no gesture present).

Optionally, the image differencing is performed in two or more passes. The first pass is performed with a relatively large block size to reduce jitter and noise. A subsequent pass is performed with a relatively smaller block size to increase point precision, but optionally only on regions likely to have motion as indicated by the first pass.

Hand gesture movements can exhibit a relatively strong angular component, pivoting from the elbow, the wrist, and/or the finger. Therefore, an extremity of the hand, such as the extended index finger, typically has relatively large displacement. For this reason, the system identifies the element in the difference matrix with a high value, such as the highest allowed value, which corresponds to a high difference, such as the greatest difference (and to relatively high displacement). In one embodiment, the system is configured to orient the camera and/or instruct the user to position himself or herself such that the camera and the user face each other. In this configuration, elements closer to the bottom of the matrix (image) can advantageously be weighted more heavily than elements closer to the top. This step applies a heuristic based on the fact that the user's finger may be pointing down relative to the camera frame, since the camera is facing the user and can be looking down at the printed media in front of the user. The weight can vary with the y coordinate of the element and can be applied to the element's value for the purpose of finding the element with relatively high movement.

Another optionally applied heuristic emulates the observation that an object moving in the frame can correspond to a region of contiguous nonzero elements in the difference matrix; that is, a moving finger can be represented by an approximately finger-shaped group of nonzero blocks. Furthermore, effects due to parallax often result in a point that is farther up the finger, and closer to the camera, than the fingertip yielding a relatively large value in the obtained difference matrix. To account for this, the system can further process the difference matrix by starting at a point of greatest difference and, if it is in a group of contiguous nonzero points, finding the point in the group closest to the bottom. In one embodiment, the search can be performed in a depth-first descending zigzag, systematically covering the blocks in the contiguous region until reaching the bottom of that region.

In one embodiment, the system can maintain a running list of the previous s such points, and adds this latest point to the list. It can then average these points to reduce noise and jitter. The resulting point is used as the coordinates provided as an output to the system, representing the current point in the camera frame indicated by the user.

The system optionally applies further processing and tests to candidate points (as supplied by the motion differencing) to find the point that is likely to correspond to the user's fingertip. One such test process compares the color profile of the region surrounding the candidate point to a statistical profile of natural nail color or to an actual sampling of the user's nail color. Another such test process further compares the color profile of a region below the candidate point to a statistical profile of skin color, or to an actual previous sampling of the current user's skin color. Still another such test is to extract significant features, such as by using edge detection, from the region around the candidate point and compare these features to features present at the tip of a finger, such as the curve formed by the finger itself or the fingernail. One example embodiment of the system optionally attains significant performance gains by selectively applying these tests only to the candidate points indicated by the motion difference algorithm, as opposed to the entire image.

Based on the processing of the gesture images, the system identifies which gesture is being made by the user by comparing image characteristics with those obtained during calibration and stored in the database. For example, to distinguish a gesture, such as between a diagonal sweep, a tap, and an underlining gesture, the system can compare the actual motion paths of the finger to the "trained" or calibrated motion paths corresponding to the sweep, the tap, and the underline. The system can then select the gesture that is the best match.

FIG. 6 illustrates an example motion difference process used to perform finger tracking and gesture determination. At state 602 the process obtains the $n_v \times m_v$ current video frame or image captured by the vision sensor. At state 604 the frame is converted the monochrome by averaging the red, green, and blue brightness levels for each pixel. Optionally, the system uses changes in color information from frame to frame as an additional measure of motion. At state 606, for each $n_b \times m_b$ rectangular block of pixels in the image, the average brightness is calculated, and a matrix I of size $n_v/n_b$ by $m_v/m_b$ is generated containing the average brightness values for the blocks. The block size and dimensions can be specified via a block size parameter.

At state 608, a determination is made as to whether the first iteration of the motion difference process is being performed for a first frame. If it is the first iteration, the process proceeds to state 610 and matrix I is copied into matrix $I_0$, and the process then proceeds to state 602 and retrieves the next image. If it is not the first iteration, the process proceeds from state 608 to state 612, where a determination is made as to whether a matrix $D_0$ has been generated yet. If matrix $D_0$ does not yet exist, at state 616 matrix D is generated, where $D=I-I_0$. At state 618, the process sets $D_0=D$. Otherwise, at state 614 the process sets $D=I-I_0+D_0 \cdot c_{fade}$, where $c_{fade}$ ranges from 0 to 1. The coefficient $c_{fade}$ is applied to diminish (dim) the previous difference matrix before the latest difference matrix is added to it. Optionally, $c_{fade}$ is set at 0, forcing the use of only the latest difference image. The process then proceeds to state 620, at which, for each element (x,y) in D, if $D(x,y)<v_{threshold}$, then the process sets $D(x,y)=0$. The threshold can be the minimum amount of average brightness difference between the same two blocks in successive images for that block to be included as a motion block. For example, the threshold can fall in a predetermined range, such as within a range of 0-255.

At state 622, the process determines if the total number of nonzero blocks in D as a fraction of the total number of blocks is less than a $blocks_{min}$ or greater than $blocks_{max}$, where $blocks_{min}$ is a selected or predetermined minimum fraction of blocks needed to register a valid finger gesture or movement. The value of $blocks_{min}$ can be dynamically adjusted, and by way of example can range from 0.0 to 1.0. One example value of $blocks_{min}$ is 0.01. Higher values of $blocks_{min}$ can be selected to better reject noise, though they can result in false positives. The value of $blocks_{max}$ is a selected or predetermined maximum fraction of blocks allowed to register a valid movement. The value of $blocks_{max}$ can be selected to prevent media movement, such as page ripples or book movement from registering as a finger gesture. One range of $blocks_{max}$ is 0.0 to 1.0, and one example value of $blocks_{max}$ is about 1.0. If the total fraction of nonzero blocks in D is less than a $blocks_{min}$ or greater than $blocks_{max}$ the current frame matrix is discarded, and the process returns to 602 for the next frame. Otherwise, the process proceeds to state 624, and the process finds an element p in D such that $p=\max(D(x,y) \cdot y^{yweight})$. At state 626, for $p=D(x,y)$, a determination is made as to whether y is even. The parameter $y^{yweight}$ is a coefficient by which points are weighted for being relatively lower in the image. This parameter favors points which are likely farther down on the finger or other object. If y is even, the process proceeds to state 628, and where $D(x+1,y)$ is defined, and $D(x+1,y)>0$, the process sets $p=D(x+1,y)$, increments x, and then repeats state 628 until the condition is no longer satisfied. Thus, the process moves to the right in the matrix row to find the first or next non-moving block (or the end of the row, if a non-moving block is not found).

If y is odd, the process proceeds to state 630, and where $D(x-1,y)$ is defined, and $D(x-1,y)>0$, then the process sets $p=D(x-1,y,)$ decrements x, and repeats state 630 until the condition is no longer satisfied. Thus, the system is still looking for a non-moving block (or the end of the row), but in the other direction as compared to the search performed above. Thus, state 628, 630 are used to perform the zigzag search pattern discussed above. At state 632, using $p=D(x,y)$, if $D(x,y+1)$ is defined, and $D(x,y+1)>0$, the process then sets $p=D(x,y+1)$. The zigzag search will move to the next line (incrementing y) if, at state 633, a determination is made that the process is not on the last row and if the block on the next line (in the x position) is a moving block. The process then loops back to 626. At state 634, p is added to vector S of the last n such points. During the process, a list of the last n gesture positions (p) is maintained to deliver a moving average, which stabilizes the reported fingertip position. For example, at state 636, the average of the points in S, $p_{average}$, is calculated and returned, and this corresponds to the coordinate indicated by finger motion in the video frame. A parameter (history_depth) can be used to specify the number of elements or generations maintained in the list discussed above with respect to state 634 and that are averaged at state 636. By way of example, 1 to 7 generations may be maintained in the list. The process then proceeds to state 602 and repeats the process using the next frame.

Selected parameters can be used to adjust the various thresholds, components, and sensitivities of the system. By way of example, the system will optionally not perform an action mapped to a gesture in response to a user gesture until there are at least a predetermined number (min_iterations) of successive reports of a gesture within a given region on the page. Optionally, in order to reduce false positives, successive gesture "hits" within a region may also be required to occur within a given or selected radius of each other (max_net_distance) before the system will perform the action corresponding to the gesture.

In providing a secondary interaction when the user gestures at the same region twice in a row (where, for example, in response to the first occurrence of the gesture, the system says the word, and in response to the second occurrence of the gesture the system spells the word) a predetermined wait period can be used before triggering the secondary action. Optionally, a ratio (alt_iterations_ratio) of gesture iterations for the first action to be triggered to the number of iterations until the second action is triggered, can be specified by the user or otherwise programmed into the system. By way of example, if min_iterations is set equal to 4 and alt_iterations_ratio is set equal to 3, a primary action can be performed after four iterations have occurred where a gesture on that region was detected, and the secondary or alternate action can be triggered after twelve iterations of gesture detection. By way of further example, if alt_iterations_ratio is set equal to 1, both the primary and secondary actions would be triggered at the same time.

In addition, given the relative size of a finger in the video frame it is expected that a certain number of movement blocks would be identified (at least more than 1) when the user is trying to gesture. However, it is desirable to avoid identifying certain low-difference blocks, corresponding to minor movements or changes, as gestures. Therefore, a parameter can be provided (min_total_difference) that specifies the minimum sum of over-threshold difference blocks used to register a gesture coordinate. Adjusting min_total_difference parameter upwards will reduce false positives due to noise, but if set too high, can make it harder to detect an authentic gesture.

Optionally, a cache can be kept for one or more page locations. A parameter can be provided that specifies the number of iterations to use a stored copy of the last known page location if the current page location cannot be determined. This cache allows gesturing to continue for a limited time even when the position of the page is temporarily lost.

In an example embodiment, the system optimizes or improves the system effectiveness by automatically calibrating for current lighting conditions, camera attributes, user skin color, user fingernail color, and user gesture speed. The calibration can be performed each time the system is turned on, each time the system determines that the user has switched media, each time the user has turned a media page, and/or periodically.

Example applications of the interaction system will now be described to further illustrate example system operations. The system can advantageously be used as an educational aid for pre-reading and early-reading students, as well as for those to whom the language being used is a foreign language. For example, a child can sit down, with a book or other printed media in the field of view of the imaging device. The printed media can be on the child's lap, on a table, on a floor, etc. Using object and/or character recognition, the system can automatically identify the book by its cover and say the name or title of the book. The child can open the book to a page, and the system recognizes the page within the book, automatically reads aloud the text on that page and/or describes figures or drawings on the page. In response to the child moving a finger diagonally across substantially the entire page, the system can read the page text aloud again. It will be understood that the system can read the page text in English or in another appropriate language. If the user points to a picture, the system will audibly provide a description of the figure, if such description has been stored in the database or is available over a computer network, such as the Internet.

If the child has difficulty reading a particular word, the child can move his fingertip back and forth beneath a given word, or, in the case of a language that is read vertically, back and forth to the right or to the left of a given word. This action can be observed and detected by the system, which in one embodiment responds by pronouncing the word or words. A subsequent repeat fingertip gesture or other appropriate gesture can indicate to the system to say and spell the word. If, for example, the child taps the word, the system can retrieve the definition from the stored dictionary, and read the definition aloud to the child.

The child can also use the same or a different fingertip gesture to request additional information from the system about something of interest that the child sees on the page (for example, a picture of a walrus). The first gesture can trigger an audio file that lists facts about walruses, such as the geographical locations where walruses can be found, what walruses eat, how much walruses weigh, how long walruses live, and so on. A subsequent gesture can trigger the display of a video of walruses in the Arctic Circle and/or can launch an Internet browser and use it to access a link or URL to retrieve and display an informative page or video about walruses.

In one embodiment, the child's interactivity (such as requests for help on words, requests for additional information, and answers to comprehension quizzes) can be stored in system non-volatile memory, or transmitted or emailed to a specified destination. The stored or forwarded data can later be reviewed by a parent or teacher and can be used to further tailor the child's education and/or future interactivity with the system.

The system can be generally applied to situations where a user interacts with printed media. For example, the system can be used to interact with a user accessing printed musical scores, where an entire score or a particular measure of music is played by the system when the user gestures on a measure or across a page. By way of further example, when the user points at a note or chord, the system can identify aloud the note or chord and then play the note or chord. The user can optionally specify, via a spoken command, via a gesture at images of instruments on the page, a menu selection, or keyboard entry, which instrument or instruments are to be used to play the musical score or selected portion thereof.

By way of further example, the system can be used to interact with a user accessing geographic maps. For example, when a user points at or otherwise appropriately gestures at a given map location, the system can identify the location gestured at, retrieve corresponding information from the database, and speak the information aloud and/or display the information textually, graphically, and/or via a video to the user. By way of illustration, the information can relate to population, currency, language, culture, economy, government, neighboring countries or cities, weather, longitude, and/or latitude, and so on.

By way of another example, the system can be used to translate printed media. The system can access a translation dictionary to translate a printed text, such as printed word, words, sentence, paragraph, or page gestured at by the user, and the system can then speak the translated word or words.

By way of further example, product information can be stored in the system database or retrieved from a database over a network can be delivered or spoken by the system when a user gestures at a product or advertisement in a magazine, newspaper, or other media.

Further, the system can be used to play games. For example, the user can play games against the system, with the user's move indicated by fingertip gesturing against or relative to a game board.

Thus, as described above, embodiments of the present invention enable users to interact with printed media by employing natural and familiar mode of interactions, such as by pointing at items on printed media. For example, embodiments of the present invention provide computerized vision-based processes that can be used to identify printed media, identify a position within the media, perform optical character recognition of printed media text, interpret user hand and finger gestures as commands, and to track the position of the user's finger relative to the position of the printed media.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A media and gesture recognition method using a computer system, the method comprising:
   viewing and generating a digital representation of a printed media using an electronic visual sensor during a first interaction session;
   identifying the printed media using the digital representation of the printed media;
   retrieving information corresponding to the viewed printed media from a computer system database;
   using the electronic visual sensor to view at least a first gesture of a user relative to at least a portion of the printed media;
   interpreting the first gesture as a first command; and
   based at least in part on the first gesture and the retrieved information, providing at least a portion of the retrieved information.

2. The method as defined in claim 1, wherein identifying the printed media further comprises recognizing visual features that correspond to scale-invariant features (SIFT).

3. The method as defined in claim 1, wherein the electronic visual sensor is mounted on a robot, wherein the robot positions itself so as to adequately view the printed media.

4. The method as defined in claim 1, wherein the electronic visual sensor is automatically tilted to improve the viewing of the printed media.

5. The method as defined in claim 1, further comprising performing gesture calibration.

6. The method as defined in claim 1, further comprising performing color balancing calibration based at least in part on a viewed portion of a userhand.

7. The method as defined in claim 1, further comprising instructing the user to perform at least one gesture during a calibration operation.

8. The method as defined in claim 1, wherein the first gesture is a diagonal sweep of a fingertip across a page of the printed media.

9. The method as defined in claim 1, wherein the first gesture is a movement of a fingertip beneath at least a first word.

10. The method as defined in claim 1, wherein the first gesture is a finger tapping movement.

11. The method as defined in claim 1, wherein the portion of the retrieved information is a word from the printed media.

12. The method as defined in claim 1, wherein the portion of the retrieved information is a sentence from the printed media.

13. The method as defined in claim 1, wherein the portion of the retrieved information is a title of the printed media.

14. The method as defined in claim 1, wherein the portion of the retrieved information is a table contents corresponding to the printed media.

15. The method as defined in claim 1, wherein the portion of the retrieved information includes a definition retrieved from an electronic dictionary.

16. The method as defined in claim 1, wherein the printed media is one of a book, a magazine, a musical score, and a map.

17. The method as defined in claim 1, further comprising:
    detecting an exception condition caused by an inadequate view of the printed media; and
    providing the user with instructions on handling the printed media to correct the exception condition.

18. The method as defined in claim 1, further comprising:
    determining that the printed media is inadequately viewed; and
    instructing the user to rotate the printed media.

19. The method as defined in claim 1, further comprising:
    detecting a timeout condition; and
    based at least in part on detecting the timeout condition, informing the user that the first interaction session is ended.

20. The method as defined in claim 1, wherein the database includes a preference that controls user interaction with the printed media at least at a book-level and a page-level, and a mapping of regions of the printed media with corresponding actions.

21. The method as defined in claim 1, further comprising detecting the first gesture by comparing at least a first image and a second image electronic received by the visual sensor.

22. The method as defined in claim 1, wherein the visual sensor includes at least one of CCD imager, a CMOS imager, and an infrared imager.

23. A vision-based method of processing user interaction with printed media, the method comprising:
    receiving at a computer system a digital representation of a first image of a printed media, wherein the first image was obtained from a first imaging device;
    based at least in part on the digital representation of the first image, retrieving corresponding information from a database;
    receiving a first digital representation of a first image of a user gesture relative to at least a portion of the printed media;
    interpreting the first digital representation of an image of a user gesture; and
    based at least in part on the interpretation of the user gesture and the retrieved database information, providing at least a portion of the retrieved information to the user.

24. The method as defined in claim 23, wherein interpreting the digital representation of an image of a user gesture further comprises:
    finding averages for corresponding blocks within the first digital representation of the first image of the user gesture;
    subtracting the averages from averages of a prior digital representation of an image to generate a difference matrix having difference blocks;
    discarding difference blocks having averages beneath a first predetermined threshold; and
    discarding difference blocks having averages above a second predetermined threshold.

25. The method as defined in claim 23, wherein the user gesture is used to select printed media text and wherein providing at least a portion of the retrieved information to the user includes reading aloud the selected text.

26. The method as defined in claim 23, wherein the user gesture is used to select a printed image in the printed media and wherein providing at least a portion of the retrieved information to the user includes displaying a video related to the printed image.

27. The method as defined in claim 23, wherein the user gesture is used to select a map location in the printed media, and wherein providing at least a portion of the retrieved information to the user includes providing information related to geographical location correspond to the selected map location.

28. The method as defined in claim 23, wherein the user gesture is used to select a portion of a musical score in the printed media, and wherein providing at least a portion of the retrieved information to the user includes audibly playing the selected portion of the musical score.

29. The method as defined in claim 23, wherein the first imaging device is mounted on an autonomous mobile apparatus, the method further comprising automatically positioning the autonomous mobile apparatus based on at least one image of the printed media.

30. The method as defined in claim 23, further comprising performing lighting calibration.

31. The method as defined in claim 23, further comprising providing the user with one or more audible media interaction prompts.

32. The method as defined in claim 23, further comprising:
    providing the user with a first prompt;
    waiting a first amount of time for the user to respond to the first prompt; and
    performing a timeout process if the user does not respond within the first amount of time.

33. The method as defined in claim 23, further comprising:

determining if the printed media is skewed; and
providing the user with skew correction prompts.

34. The method as defined in claim 23, further comprising:
determining if the printed media is moving; and
providing the user with an instruction to stop moving the media.

35. The method as defined in claim 23, further comprising:
determining if at least a first page of the printed media is not within a first image frame; and
informing the user that the system cannot view the entire page.

36. A computer-based printed media interaction apparatus, the apparatus comprising:
an image sensor, the image sensor configured to view printed media;
a database including a mapping of regions of the printed media with corresponding actions;
a gesture tracking module that tracks a user gesture position relative to the printed media based at least in part on images from the image sensor; and
an interaction module that, based at least in part on the user gesture position and database information, provides at least a portion of the database information to the user.

37. The apparatus as defined in claim 36, further comprising a plurality of motorized wheels under computer control used to position the image sensor to view the printed media.

38. The apparatus as defined in claim 36, further comprising an exception module that informs the user when the printed media is not being adequately viewed by the image sensor.

39. The apparatus as defined in claim 36, further comprising an exception module that informs the user when the printed media is moved.

40. The apparatus as defined in claim 36, wherein the gesture tracking module determines a difference between at least two images and filters out difference values greater than a first amount and difference values less than a second amount.

41. The apparatus as defined in claim 36, wherein the image sensor is a pan and scan camera.

42. The apparatus as defined in claim 36, wherein the gesture tracking module determines if the user is making at least one of a read a word gesture and a read a page gesture.

43. The apparatus as defined in claim 36, wherein the gesture tracking module determines if the gesture corresponds to a request for a word definition.

44. The apparatus as defined in claim 36, further comprising a dictionary.

45. The apparatus as defined in claim 36, further comprising a topic-specific dictionary.

46. The apparatus as defined in claim 36, further comprising a network link to information corresponding to the printed media.

47. The apparatus as defined in claim 36, further comprising a speaker that audibly provides the database information to the user.

48. The apparatus as defined in claim 36, further comprising a display that visually provides the database information to the user.

49. The apparatus as defined in claim 36, wherein the printed media is one of a magazine, a musical score, and a book.

50. The apparatus as defined in claim 36, further comprising a character recognition module that converts images of text into text.

51. A media and gesture recognition apparatus, the apparatus comprising:
an image sensor that views printed media;
a recognition module that identifies the printed media based on image information from the image sensor;
a database that stores information that relates portions of the printed media with corresponding actions;
a gesture tracking module that identifies user gestures relative to the printed media based at least in part on images from the image sensor; and
an interaction module that, based at least in part on the user gesture and database information, provides at least a portion of the database information to the user.

52. The apparatus as defined in claim 51, wherein the apparatus is stationary.

53. The apparatus as defined in claim 51, wherein the apparatus includes computer controlled motors that move the apparatus to view the printed media.

54. The apparatus as defined in claim 51, further comprising a print media support apparatus.

55. The apparatus as defined in claim 51, wherein the database includes text from the printed media, the apparatus further comprising a speaker that audibly reads at least a portion of the text to the user.

56. The apparatus as defined in claim 51, further comprising a character recognition module that converts images of text into text.

57. The apparatus as defined in claim 51, further comprising a dictionary.

* * * * *